March 28, 1967  R. L. ZIMMERMAN ETAL  3,311,584
INTERPOLYMERS OF VINYLIDENE AROMATIC, BUTADIENE
AND HALF ESTER OF MALEIC ACID
Filed March 2, 1964
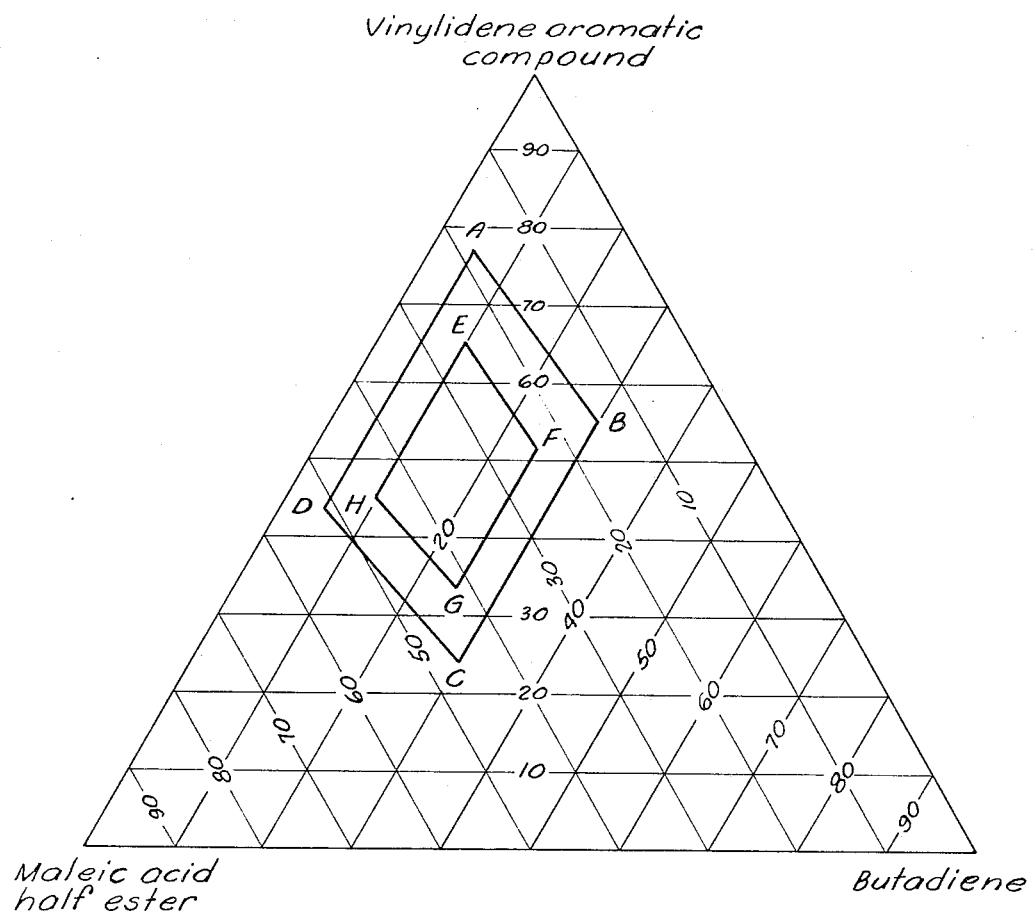
INVENTORS.
Robert L. Zimmerman
George B. Sterling
ATTORNEY United States Patent Office 3,311,584
Patented Mar. 28, 1967

3,311,584
INTERPOLYMERS OF VINYLIDENE AROMATIC, BUTADIENE AND HALF ESTER OF MALEIC ACID
Robert L. Zimmerman, Midland, Mich., and George B. Sterling, Mogadore, Ohio, assignors to The Dow Chemical Company, Midland, Mich., a corporation of Delaware
Filed Mar. 2, 1964, Ser. No. 348,699
8 Claims. (Cl. 260—29.7)

This invention concerns interpolymers of vinylidene aromatic compounds, conjugated diolefins and half esters of maleic acid. It relates more particularly to soluble film forming interpolymers suitable for use as coating resins and capable of curing or vulcanizing to insoluble film possessing good resistance to water and organic liquids, and pertains to a method of making the interpolymers.

It is an object of the invention to prepare soluble interpolymers of vinylidene aromatic compounds, conjugated diolefins and half esters of maleic acid, which polymers are film forming and are capable of curing to form insoluble cross-linked or vulcanized coatings. Another object is to provide a process for making such soluble interpolymers. Other and related objects may appear from the following description of the invention.

According to the invention soluble interpolymers of a vinylidene aromatic compound, a conjugated diolefin and a half ester of maleic acid can readily be prepared by polymerizing a mixture of the monomers in an inert organic liquid as solvent and reaction medium in proportions within the area ABCD of the trilinear diagram of the drawing as more fully hereinafter described.

The vinylidene aromatic compounds to be employed can be any vinylidene aromatic compound or nuclear substituted vinylidene aromatic compound of the benzene series having a vinyl radical directly attached to a carbon atom of the aromatic nucleus. Examples of suitable unsaturated aromatic compounds are styrene, vinyltoluene, vinylxylene, ethylvinylbenzene, isopropylstyrene, chlorostyrene, bromostyrene, fluorostyrene, dichlorostyrene, tert.-butyl styrene, methoxystyrene or chlorovinyl toluene. The monovinyl aromatic hydrocarbons, i.e. styrene and nuclear alkylstyrenes are preferred. The vinylidene aromatic compound can be used in amount of from 24 to 77 percent by weight and within the area defined by the lines ABCD of the trilinear diagram of the drawing.

The conjugated diolefin can be butadiene, isoprene, chloroprene, methylbutadiene or dimethylbutadiene, but is preferably butadiene. The conjugated diolefin can constitute from 5 to 30, preferably from 10 to 25, percent by weight of the interpolymer and within the area defined by the lines ABCD of the trilinear diagram of the drawing.

The half ester or acid ester of maleic acid can be an ester of maleic acid or maleic anhydride having the general formula

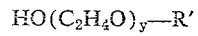

wherein R is an organic radical containing from 2 to 30 carbon atoms and an alkyl, oxyalkyl or alkaryloxyalkylene ether linkages. More specifically, the acid maleate can be a half ester having the above general formula wherein R represents a member of the group consisting of alkyl radicals containing from 2 to 30, preferably from 2 to 18 carbon atoms, and oxyethylene radicals of the formula —(C$_2$H$_4$O)$_x$R' wherein R' is a member of the group consisting of alkyl radicals containing from 1 to 8 carbon atoms and radicals of the formula —H$_4$C$_6$—R" wherein R" represents an alkyl radical containing from 9 to 15 carbon atoms and $x$ is an integer from 1 to 6, preferably from 1 to 2. Examples of suitable acid esters of maleic acid are ethyl acid maleate, isopropyl acid maleate, hexyl acid maleate, octyl acid maleate, isooctyl acid maleate, hexadecyl acid maleate and the acid esters of said acid and monoalkyl ethers of mono-, di-, tri-, tetra-, penta- and hexa-ethylene glycols having the formula $$HO(C_2H_4O)_y—R'$$

wherein R' is an alkyl radical containing from 1 to 8 carbon atoms or an alkaryl radical of the formula $$—H_4C_6—R''$$

wherein R" is an alkyl radical containing from 9 to 15 carbon atoms, such as ethylene glycol monoethyl ether acid maleate, diethylene glycol monobutyl ether acid maleate, tetraethylene glycol monohexyl ether acid maleate, hexaethylene glycol mono-2-ethylhexyl ether acid maleate, hexaethylene glycol monododecylphenyl ether acid maleate, and tetraethylene glycol monononylphenyl ether acid maleate. The acid maleates are preferably half esters of maleic acid or maleic anhydride and a mono- or diethylene glycol monobutyl ether. The half esters are used in amount of from 15 to 51.5, preferably from about 20 to 45, percent by weight of the sum of the weights of the unsaturated ingredients used in making the interpolymers and within the area defined by the lines ABCD of the trilinear diagram of the drawing. The area defined by the lines EFGH of the trilinear diagram of the drawing defines a preferred range and proportions of the ingredients in the interpolymers.

The interpolymers are prepared by polymerizing the monomeric ingredients in contact with one another with or without a chain regulator, e.g. alpha-methyl styrene, alpha-methyl styrene dimer, or lauryl mercaptan, and in a liquid solvent and reaction medium such as lower aliphatic alcohols, ketones, and aliphatic or aromatic hydrocarbons or mixtures thereof. Examples of suitable organic liquids are ethyl alcohol, isopropyl alcohol, butyl alcohol, hexane, heptane, benzene, toluene, xylene, isopropylbenzene, ethylbenzene and diethylbenzene. The polymerization is continued until complete or substantially complete, i.e. until 85 percent or more of the monomers are polymerized.

The reaction can be carried out at atmospheric, subatmospheric or superatmospheric pressure and at temperatures between about 60° and 180° C. in the presence of a free radical generating initiator or polymerization catalyst. Suitable catalysts are organic peroxides such as benzoyl peroxide, di-tert.-butylperoxide, tert.-butylperacetate, dicumyl peroxide and the like. The peroxide can be used in amount corresponding to from 0.5 to 5 percent by weight of the polymerizable starting materials.

The interpolymers are obtained as a solution of the polymer in the organic liquid reaction medium. The polymer can be recovered in usual ways, e.g. by precipitation and recovering of the precipitate, or by evaporating the solvent. The polymers are soluble in solvents and have a viscosity characteristic of 3 centipoises or below as determined for a 10 weight percent solution of the polymer in methyl ethyl ketone at 25° C., and preferably have a solution viscosity of from 0.5 to 1.5 centipoises. In recovering the polymer the solvent is evaporated under reduced pressure and preferably at temperatures of 30° C. or below. The solution of the polymer in the reaction medium can be used per se as a film forming coating, or as an ingredient in the preparation of coating compositions, by blending therewith pigments, fillers, curing agents, plasticizers, light stabilizing agents, antioxidants, or cross-linking agents.

Films of the interpolymers, especially films containing a small amount of paint dryers such as cobalt naphthenate can be baked and cured or vulcanized to form coatings that are tightly adherent to metals and are insoluble in water and organic solvents such as ketones, alcohols and gasoline.

The following examples illustrate ways in which the principle of the invention has been applied, but are not to be construed as limiting its scope.

*Example 1*

A charge of 94 grams of styrene, 30 grams of butadiene-1,3 and 76 grams of the half ester of maleic acid and monobutyl ether of diethylene glycol, together with 100 grams of xylene as solvent and reaction medium and 10 grams of benzoyl peroxide as polymerization initiator or catalyst, was sealed in a glass bottle and was heated with tumbling of the bottle end over end in a water bath maintained at 80° C. for a period of 30 hours, then was removed from the bath and was cooled to room temperature and the bottle opened. The devolatilized product was a solid transparent amber colored tough resinous copolymer. The conversion of monomers to polymer was 98.5 percent based on the monomers initially used.

*Example 2*

A charge of 332 grams of a solution of a copolymer, prepared by polymerizing a mixture of styrene, butadiene, and the half ester of maleic acid and monobutyl ether of diethylene glycol, in xylene in proportions and by procedure as described in Example 1, was dispersed in 1050 ml. of water. A charge of 30 ml. of a concentrated 14.2 normal aqueous ammonium hydroxide solution added. The resulting mixture was heated to azeotropically distill xylene therefrom, after adding 0.5 ml. of a silicone fluid antifoam agent. After distilling 117 ml. of xylene and 458 ml. of water, the residue contained about 26 percent by weight of solids and had the appearance of a latex. A charge of 10 ml. of concentrated aqueous ammonium hydroxide solution was added with stirring. A stiff gel was obtained, which gel upon heating on a steam bath at atmospheric pressure was a pourable translucent solution having a pH value between 8.5 and 9.0. A layer of the resinous copolymer solution was cast onto a metal test plate and dried to a tough, clear film. Upon baking the film for 1 hour in an oven at 200° C. it was insoluble in water, and in xylene. Another portion of the aqueous solution of the ammonium salt of the resinous copolymer, consisting of 100 grams of the solution was mixed with 65 grams of a pigment mixture, prepared by mixing together ingredients consisting of 2100 parts by weight of $BaSO_4$, 900 parts of red iron oxide, 760 parts of water, 18 parts of polypropylene glycol having an average molecular weight of 1200 and 48 parts of Tamol 731 (25 percent active polymeric surface active agent), to form a uniform blend. A layer of the resulting pigmented resinous copolymer solution mixture was coated onto steel test panels and was dried in air to form a smooth coating. In another test of the pigmented aqueous dispersion of the resinous copolymer, a charge of 0.5 gram of a 6 weight percent mixture of cobalt naphthenate dryer was blended with 100 parts by weight of the pigmented aqueous dispersion. This dispersion was coated onto steel test panels and was dried in air at room temperature, then was baked in an oven at 250° C. for 15 minutes to form a coating one mil thick. The baked coating did not crack or peel upon bending around a 0.25 inch mandrel and withstood a 30 inch pound front impact test. The coating did not swell, peel or crack upon being subjected to steam at atmospheric pressure for a period of 4 hours.

*Example 3*

In each of a series of experiments, a charge of styrene, butadiene and the half ester of maleic acid and monobutyl ether of diethylene glycol, together with acetone as solvent and reaction medium in amount equal to one-half the sum of the weights of the monomers initially used, and 5 percent by weight of benzoyl peroxide, based on the sum of the weights of the monomers, as polymerization catalyst were sealed in a closed container in proportions as stated in the following table and were heated with stirring at a temperature of 80° C. for a period of 30 hours to polymerize the monomers to a resinous copolymer. The product was a clear viscous solution of the copolymer in the acetone solvent and reaction medium. Layers of the solutions of the copolymers dried to form continuous adherent films and were useful as coatings. Alkali salts of the polymers were soluble in water to form aqueous solutions suitable for pigmenting to form primer coatings for metals. Table I identifies the experiments and gives the proportions of the monomers employed in preparing the same, together with the proportion of acetone based on the sum of the weights of the monomers initially used. The table also gives the conversion or percent polymerization based on the weight of the monomers initially used.

TABLE I

| Run No. | Starting Materials, Percent | | | Solvent Acetone, Percent | Product Conversion, Percent |
|---|---|---|---|---|---|
| | Styrene | Butadiene | Half-Ester | | |
| 1 | 51 | 15 | 34 | 50 | 92.5 |
| 2 | 47 | 15 | 38 | 50 | 96.5 |
| 3 | 43 | 15 | 42 | 50 | 97.0 |
| 4 | 38 | 15 | 47 | 50 | 100 |

*Example 4*

A charge of 47 grams of styrene, 15 grams of butadiene and 38 grams of the half ester of maleic acid and monobutyl ether of diethylene glycol, together with 50 grams of isopropyl alcohol and 5 grams of benzoyl peroxide were sealed in a glass vessel and heated and agitated at a temperature of 80° C. for a period of 30 hours to polymerize the monomers, then was cooled to room temperature and the vessel opened. The product was a clear, viscous solution of the copolymer. The conversion of monomers to polymer was 98.5 percent.

*Example 5*

A charge of 32 grams of syrene, 30 grams of butadiene and 38 grams of the half ester of maleic anhydride and monobutyl ether of diethylene glycol, together with 50 grams of ethyl alcohol and 5 grams of benzoyl peroxide were sealed in a glass bottle and heated with agitating at a temperature of 80° C. for a period of 30 hours. The product was a clear viscous solution of the resinous copolymer. The conversion was 94.7 percent.

*Example 6*

A charge of 288 grams of styrene, 300 grams of xylene as solvent and reaction medium, and 180 grams of butadiene-1,2 was placed in a glass pressure resistant vessel. A mixture of 252 grams of the half ester of maleic acid and monobutyl ether of diethylene glycol, 80 grams of xylene, 2.7 grams of di-tert.-butyl peroxide and 2.7 grams of tert.-butyl hydroperoxide was placed in a feed vessel connected by means of a conduit to the reaction vessel. The feed mixture was added gradually to the reaction vessel over a period of about 2.5 hours, while heating the resulting mixture at polymerization temperatures between about 86° and 150° C. under the autogenous pressure of the mixture of the materials, thereafter 230 grams of xylene were added and heating of the solution was continued for about 1.5 hours longer. There was obtained 1255 grams of liquid product. A weighed portion of the liquid product was devolatilized and was found to consist of 44.3 percent by weight of copolymer. The conversion was 88.6 percent based on the starting materials. The copolymer had a viscosity characteristic of 1.28 centipoises as determined for a 10 weight percent solution of the copolymer in methyl ethyl ketone at 25° C.

A portion of the liquid product was mixed with 0.02 percent by weight of cobalt naphthenate, 0.02 percent of manganese naphthenate and 0.06 percent lead naphthenate and a layer of the resulting liquid mixture cast on a 2.5 mil. thick sheet iron test panel and was dried in air to form a film 1.5 mils. thick. The cast layer dried in air at room temperature in 15 hours to a non-tacky film, and after 5 days (120 hours) did not crack when the coated test panel was bent around a 0.25 inch diameter mandrel. The dried coating withstood a 30 pound reverse impact test. Baking of the dried film in an oven at a temperature of 140° C. for a period of 30 minutes rendered the film insoluble in xylene. Baking at 200° C. for 20 minutes gave a film with excellent resistance to xylene. The baked film did not peel or soften when immersed in boiling water for a period of 16 hours.

*Example 7*

A charge of 417.6 grams of styrene and 280 grams of xylene were placed in a pressure resistant glass reactor.

polymer. A layer of the dispersion was cast on steel test panels and was dried in air to form a tough adherent film. Upon baking in an oven at 200° C., the film became insoluble in water.

*Example 8*

A number of copolymers of styrene, butadiene and a half ester of maleic acid in proportions and kind as identified in the following table, were prepared by procedures similar to those described in Examples 4, 5 and 6. A portion of the copolymers was tested as coating for metal and was found, after baking, to have excellent resistance to xylene and hot water. The table identifies the experiments and gives the proportions of the ingredients employed in making the copolymers. The table also names the solvent used as reaction medium in preparing the copolymer, and identifies the half ester of maleic acid used. The table gives a viscosity characteristic determined for a 10 weight percent solution of the copolymer in methyl ethyl ketone at 25° C.

TABLE

| Run No. | Starting Materials | | | | Solvent—Kind | Product Viscosity, cps. |
| --- | --- | --- | --- | --- | --- | --- |
| | Styrene, percent | Butadiene, percent | Half Ester of Maleic Acid—Kind | Percent | | |
| 1 | 77 | 5 | Ethyl acid maleate | 18 | Xylene | 1.37 |
| 2 | a 55 | 30 | Diethylene glycol monobutyl ether acid maleate | 15 | Isopropyl benzene | 0.94 |
| 3 | 24 | 30 | ----- do ----- | 46 | Ethyl alcohol | |
| 4 | 50 | 5 | ----- do ----- | 45 | Isopropyl alcohol | |
| 5 | 65 | 10 | Isooctyl acid maleate | 25 | Xylene | 1.19 |
| 6 | 51 | 25 | Ethyl acid maleate | 24 | ----- do ----- | 1.75 |
| 7 | b 33 | 25 | Diethylene glycol monobutyl ether acid maleate | 42 | Isopropyl benzene | 0.80 |
| 8 | 45 | 10 | Isooctyl acid maleate | 45 | Xylene | |
| 9 | 32 | 20 | Tetraethylene glycol mono-nonylphenyl ether acid maleate | 48 | ----- do ----- | 1.21 |
| 10 | 40 | 30 | Isooctyl acid maleate | 30 | ----- do ----- | 2.68 |
| 11 | 53 | 5 | Hexaethylene glycol mono-dodecylphenyl ether acid maleate. | 42 | ----- do ----- | 1.27 |
| 12 | c 63.5 | 20 | Mixed hexadecyl acid maleates | 16.5 | Ethyl benzene | 2.34 |
| 13 | 63.5 | 5 | Tripropylene glycol monomethyl ether acid maleate | 31.5 | Xylene | 1.32 | a A mixture of 50% by weight of styrene and 50% alpha-methyl styrene.
b Alpha-methylstyrene.
c p.-tert.-Butylstyrene.

A feed solution of 216 grams of the half ester of maleic acid and monobutyl ether of diethylene glycol, 200 grams of xylene, 86.4 grams of butadiene, 2.7 grams of di-tert.-butyl peroxide and 2.7 grams of tert.-butyl hydroperoxide was placed in a feed vessel. The feed solution was added at a rate of about 150 grams per hour to the styrene in the reaction vessel, while heating the resulting mixture at polymerization temperatures between about 85° and 140° C. Thereafter, 220 grams of xylene were added and heating was continued for about 1.5 hours. There was obtained 1292 grams of liquid product consisting of a transparent slightly yellow solution of moderate viscosity and containing 48.3 percent by weight of copolymer. The conversion was 96 percent based on the starting materials. A ten weight percent solution of the copolymer in methyl ethyl ketone at 25° C. had an absolute viscosity of 0.99 centipoise. A portion of the liquid product was mixed with cobalt, manganese, and lead naphthenates in proportions as employed in Example 6 and was cast as a layer on steel test panels and dried to form a film 1.2 mils thick. The dried coating did not crack upon bending the test panels around a 0.25 inch diameter mandrel and withstood a 30 inch pound reverse impact test. When the dried film was baked in an oven at 200° C. for 20 minutes it became insoluble in xylene and did not peel after being immersed for 16 hours in boiling water.

A 100 gram portion of the liquid product was mixed with 150 grams of methyl alcohol. The polymer precipitated. It was separated by filtering and was dissolved in 25 grams of monobutyl ether of ethylene glycol by heating on a steam bath. To the solution there were added 4 grams of an aqueous 28 weight percent solution of ammonium hydroxide, with stirring, followed by the adding of 50 ml. of water. The resulting mixture was a translucent dispersion of the ammonium salt form of the co-

We claim:

1. An interpolymer containing in chemically combined form from 24 to 77 percent by weight of at least one vinylidene aromatic compound, from 5 to 30 percent by weight of butadiene and from 15 to 51.5 percent by weight of at least one monoester of maleic acid having the general formula

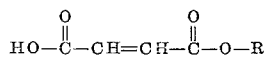

wherein R is a member of the group consisting of alkyl radicals containing from 2 to 18 carbon atoms and oxyethylene radicals of the formula $-(C_2H_4O)_xR'$ wherein R' is a member of the group consisting of alkyl radicals containing from 1 to 8 carbon atoms and radicals of the formula $R''-C_6H_4-$ wherein R'' represents an alkyl radical containing from 9 to 15 carbon atoms and $x$ is an integer from 1 to 6, and within the area defined by the lines ABCD of the drawing.

2. An interpolymer as claimed in claim 1, wherein the vinylidene aromatic compound is styrene.

3. An interpolymer as claimed in claim 1 wherein the monoester of maleic acid is diethylene glycol monobutyl ether acid maleate.

4. An interpolymer as claimed in claim 3 wherein the vinylidene aromatic compound is styrene.

5. A coating composition comprising an interpolymer of from 24 to 77 percent by weight of at least one vinylidene aromatic compound, from 5 to 30 percent by weight of butadiene and from 15 to 51.5 percent by weight of at least one monoester of maleic acid having the general formula

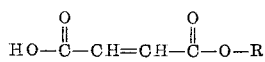

wherein R is a member of the group consisting of alkyl radicals containing from 2 to 18 carbon atoms and oxyethylene radicals of the formula —$(C_2H_4O)_xR'$ wherein R' is a member of the group consisting of alkyl radicals containing from 1 to 8 carbon atoms and radicals of the formula R"—$C_6H_4$— wherein R" represents an alkyl radical containing from 9 to 15 carbon atoms and $x$ is an integer from 1 to 6, and within the area defined by the lines ABCD of the drawing, dissolved in a solvent.

6. An aqueous coating composition comprising the ammonium salt of an interpolymer as claimed in claim 5 dissolved in an aqueous solvent.

7. A coating composition as claimed in claim 5 wherein the interpolymer consists of styrene butadiene and diethyleneglycol monobutyl ether acid maleate.

8. A process which comprises polymerizing from 24 to 77 percent by weight of at least one vinylidene aromatic compound, from 5 to 30 percent by weight of butadiene and from 15 to 51.5 percent by weight of at least one monoester of maleic acid having the general formula

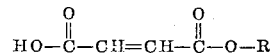

wherein R is a member of the group consisting of alkyl radicals containing from 2 to 18 carbon atoms and oxyethylene radicals of the formula —$(C_2H_4O)_xR'$ wherein R' is a member of the group consisting of alkyl radicals containing from 1 to 8 carbon atoms and radicals of the formula R"—$C_6H_4$— wherein R" represents an alkyl radical containing from 9 to 15 carbon atoms and $x$ is an integer from 1 to 6, and within the area defined by the lines ABCD of the drawing, dissolved in a solvent.

References Cited by the Examiner
UNITED STATES PATENTS 2,912,413 11/1959 Baer _____ 260—78.5
3,004,958 10/1961 Berens _____ 260—78.5

MURRAY TILLMAN, *Primary Examiner.*

J. ZIEGLER, *Assistant Examiner.*